O. J. SHAUL.
DEMOUNTABLE CLUTCH RIM.
APPLICATION FILED JAN. 25, 1918.
1,296,327.
Patented Mar. 4, 1919.
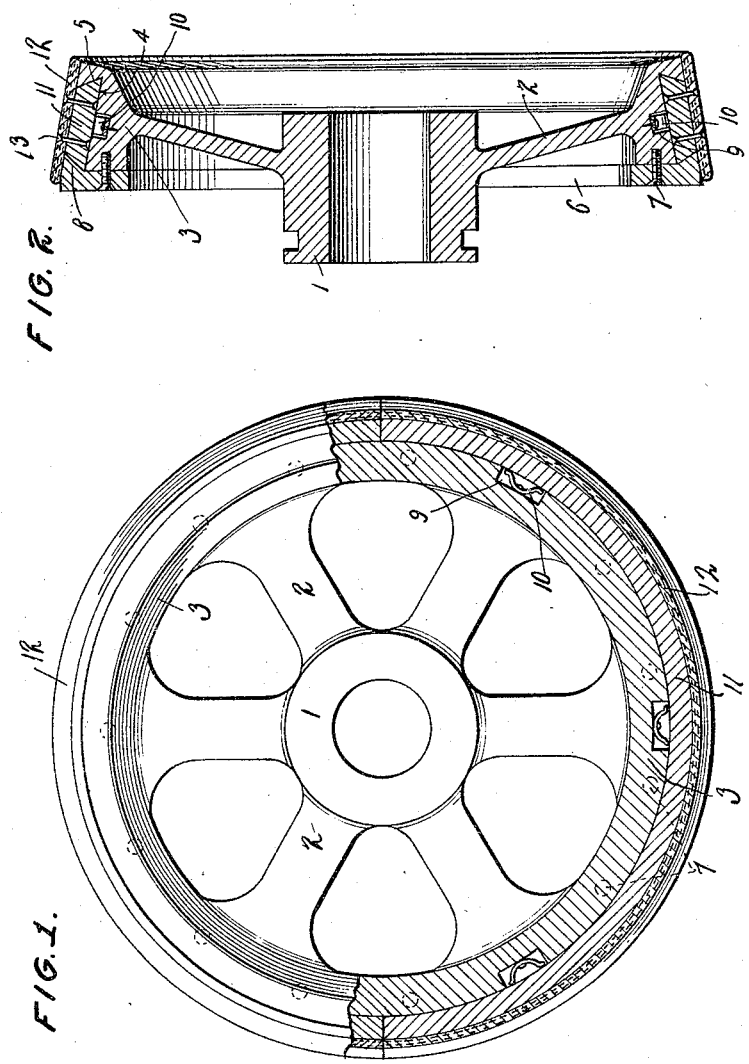
INVENTOR
Oliver J. Shaul
WITNESSES
W. C. Fielding
N. L. Collamer
BY Richard Owen.
ATTORNEY

UNITED STATES PATENT OFFICE.

OLIVER JAMES SHAUL, OF EDMON, PENNSYLVANIA.

DEMOUNTABLE CLUTCH-RIM.

1,296,327. Specification of Letters Patent. Patented Mar. 4, 1919.

Application filed January 25, 1918. Serial No. 213,787.

*To all whom it may concern:*

Be it known that I, OLIVER J. SHAUL, a citizen of the United States, residing at Edmon, in the county of Armstrong and State of Pennsylvania, have invented certain new and useful Improvements in Demountable Clutch-Rims, of which the following is a specification.

This invention relates to clutches, and more especially to linings or facings therefor; and the object of the same is to mount such facing on a sectional demountable rim or band which is held removably on the periphery or conical face of the clutch member.

This object is carried out as explained below, reference being made to the drawings, wherein:—

Figure 1 is an elevation of this improved cone with one section of the band omitted and the parts in sectional view.

Fig. 2 is a vertical section through the center of the device.

I have illustrated my invention as applied to the ordinary cone clutch now commonly employed in automobiles, and for purposes of illustration I refer to the hub as 1, spokes as 2, and the rim as 3, said rim being slightly conical as usual. In its outer face is formed a channel 4 whose forward wall 5 is undercut. The numeral 6 designates a ring removably secured to the rear or larger side of the rim 3 by any fastening means such as screws 7, and the forward wall of this ring is undercut at 8. The result is that the channel 4 which is completed by the attachment of the ring becomes dove-tailed in cross section. The bottom of the channel may have pockets 9 in which are mounted springs 10 of any appropriate type for pressing the lining outward, but this detail forms no part of the present invention.

In the channel is now removably inserted a sectional band 11 of proper cross section to fit the channel when the parts are assembled. This band is preferably of metal, and may be made in two or more sections fitting end to end around the clutch. To the outer and narrow face of each section is secured the leather lining or facing 12 as by means of rivets 13 or otherwise. The parts are so made that when the screws or other fastening devices 7 are set up tight, the undercut front wall 8 of the ring 6 will bear upon the rear edge of the several sections of the band and press them forward so that their front edge will be borne into close contact with the undercut wall 5 of the channel 4, and thereby prevent any section and all sections from becoming dislodged or from slipping within the channel.

When now a clutch equipped with this facing or lining becomes worn, it is only necessary to loosen and remove the ring 6, and then withdraw and replace the sections one by one. This can be done without taking the ring off the shaft which passes through the hub, and of course, the sections can be removed and replaced without disturbing the parts, and even without separating the members of the clutch further than to withdraw the cone member from the socket member as usual. Having replaced the sections of the band, the ring is reapplied and fastened in place, and the motorist proceeds on his way.

What is claimed as new is:—

1. In a clutch, the combination with a clutch member whose rim is channeled on its periphery, one wall of the channel being undercut, and a ring removably closing the opposite side of the channel and undercut to form the complementary wall; of a band removably mounted in said channel and tapered at its edges to conform with the undercut walls, and facing elements secured on the band.

2. In a clutch, the combination with a clutch member whose rim is channeled on its periphery, one wall of the channel being undercut, and a ring removably closing the opposite side of the channel and undercut to form the complementary wall; of a sectional band whose sections are shaped to fit said channel and to abut end to end when in place, and facings on the channeled sections.

3. In a cone clutch, the combination with a hub, spokes, a conical rim having a channel in its periphery, a ring at the larger end of the rim, and means for holding it removably attached thereto, the walls of said channel being undercut; of a sectional band whose sections fit said channel end to end and with their edges contacting with said undercut walls, and a facing secured on said sections.

In testimony whereof I affix my signature in presence of two witnesses.

OLIVER JAMES SHAUL.

Witnesses:
EARL T. RINGLA,
ROY M. STRAWN.

Copies of this patent may be obtained for five cents each, by addressing the "Commissioner of Patents, Washington, D. C."